United States Patent [19]

Reilly

[11] 4,229,725
[45] Oct. 21, 1980

[54] WIND SHEAR WARNING SYSTEM FOR AIRCRAFT

[76] Inventor: Richard J. Reilly, 1759 Venus, St. Paul, Minn. 55112

[21] Appl. No.: 905,377

[22] Filed: May 12, 1978

Related U.S. Application Data

[63] Continuation of Ser. No. 662,557, Mar. 1, 1976, abandoned.

[51] Int. Cl.² .................... G08B 21/00; G01C 23/00
[52] U.S. Cl. .............................. 340/27 SS; 73/178 T; 244/191; 244/182; 340/626
[58] Field of Search ............ 340/27 SS, 27 R, 27 NA, 340/27 AT, 190, 196, 201 P, 181, 611, 614, 626; 364/428, 424, 434, 427, 433; 244/182, 191, 183, 188; 73/178 R, 178 T

[56] References Cited

U.S. PATENT DOCUMENTS

| 3,048,329 | 8/1962 | Berggren | 73/178 T |
| 3,285,067 | 11/1966 | Greene | 244/191 |
| 3,840,200 | 10/1974 | Lambregts | 244/182 |
| 4,012,713 | 3/1977 | Greene et al. | 340/27 R |
| 4,079,905 | 3/1978 | Greene | 340/27 SS |
| 4,133,503 | 1/1979 | Bliss | 340/27 SS |

Primary Examiner—John W. Caldwell, Sr.
Assistant Examiner—James J. Groody
Attorney, Agent, or Firm—Neil B. Schulte

[57] ABSTRACT

A system to warn an aircraft pilot of a hazardous wind shear condition in which the rate of change of airspeed is compared to the ability of the aircraft to respond thereto. Any difference therebetween that exceeds a predetermined threshold is used to activate a suitable alarm or compensation device. Additional refinements include correcting the inertial speed inputs for vertical components and autopilot induced throttle changes, and correcting the air speed inputs for short term fluctuations.

4 Claims, 9 Drawing Figures

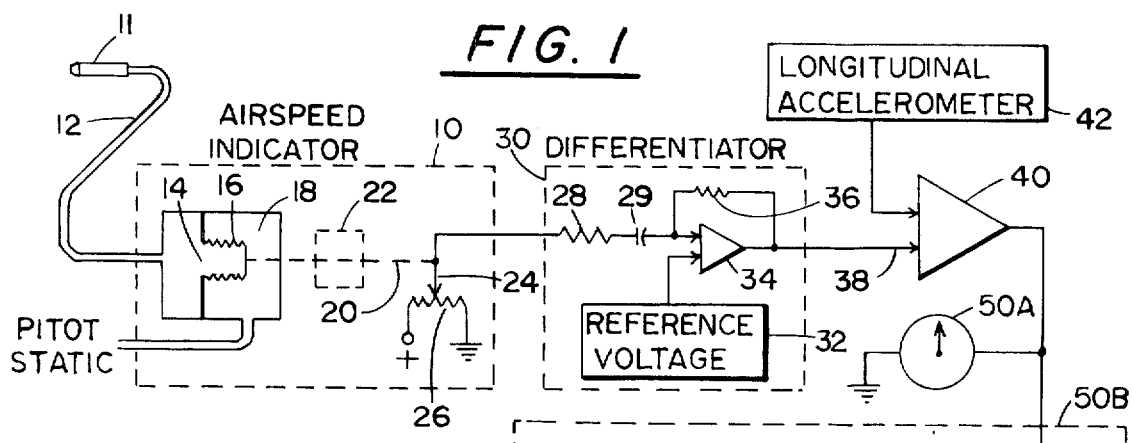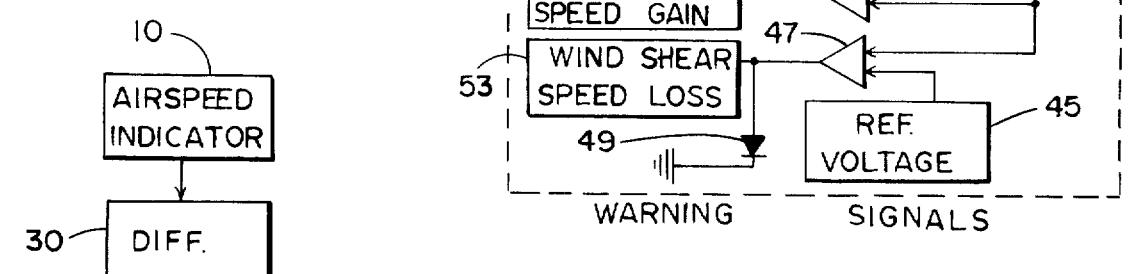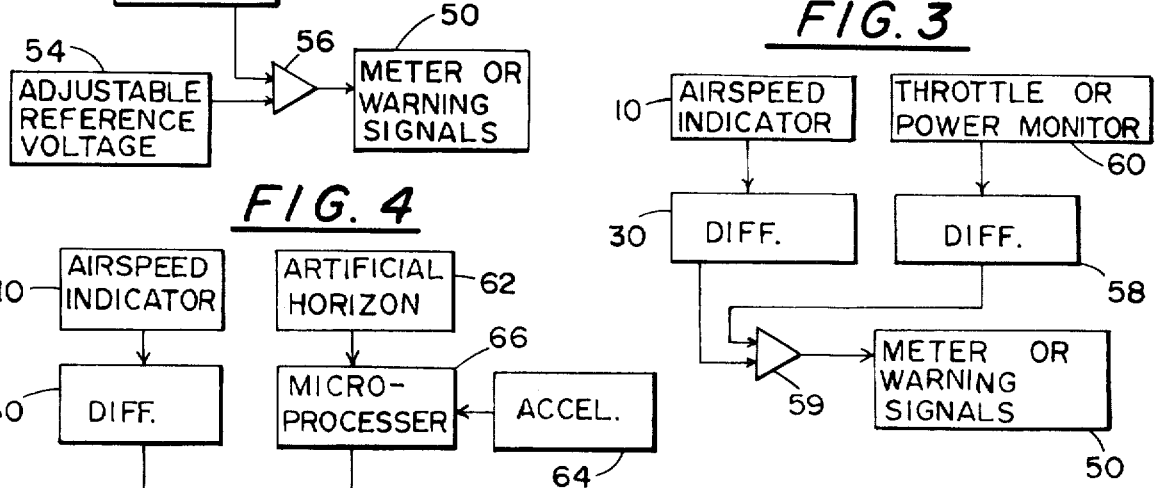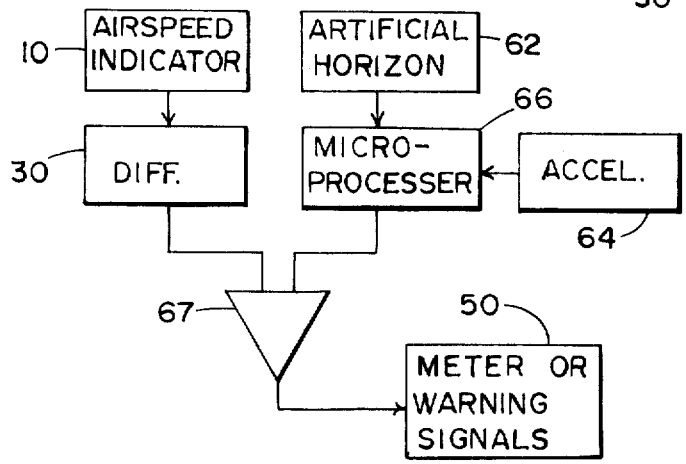

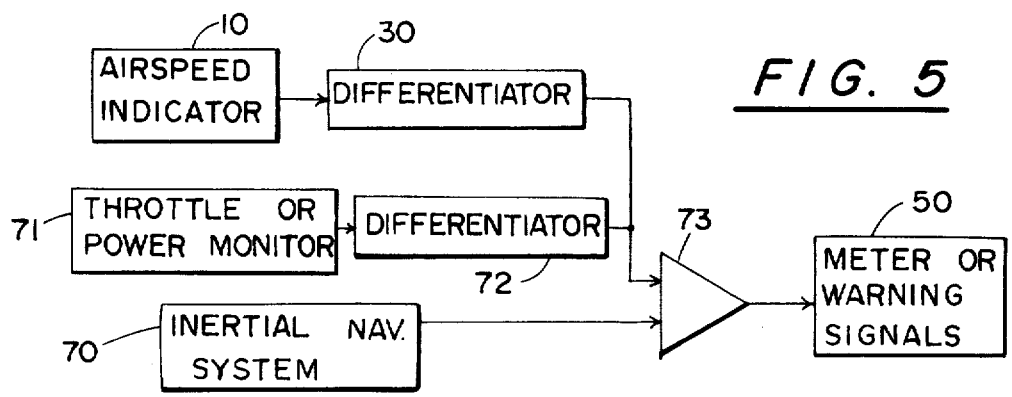
FIG. 5
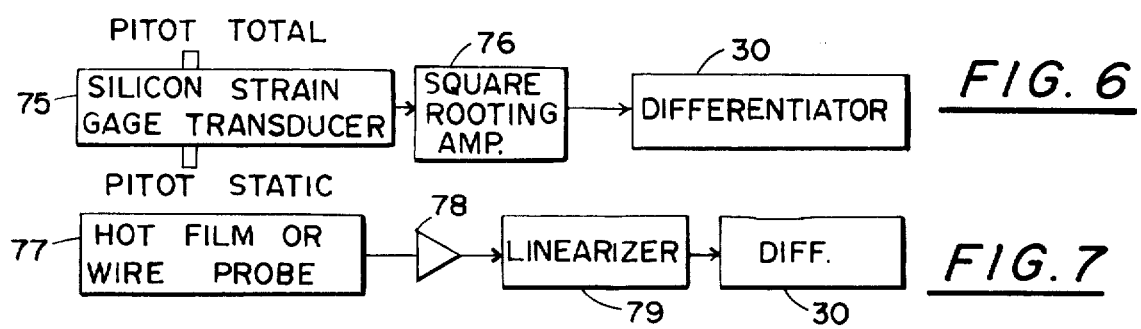
FIG. 6
FIG. 7
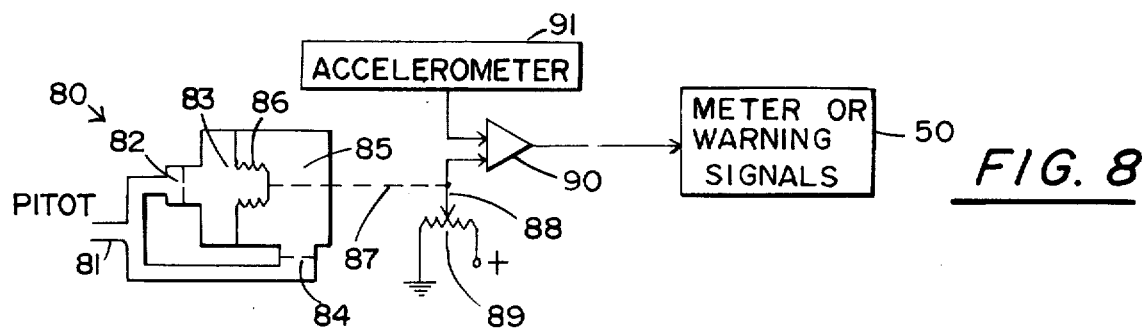
FIG. 8
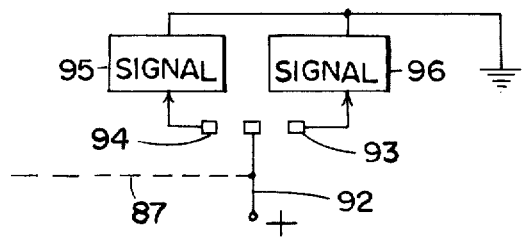
FIG. 9

WIND SHEAR WARNING SYSTEM FOR AIRCRAFT

This is a continuation of application Ser. No. 662,557 filed Mar. 1, 1976 now abandoned.

BACKGROUND OF THE INVENTION

Wind shear accidents have become an increasingly recognized problem in aviation. The accidents are commonly associated with a descent to an airport wherein the aircraft leaves a mass of air moving with a given velocity and direction and descends into wind conditions nearer the ground which are radically different both in velocity and direction. The unexpected increase or decrease in speed causes the aircraft to overshoot or undershoot the runway. On take off the wind shear can, in some cases, be so severe as to lower the air speed to the point where the aircraft stalls or settles back to the ground.

Classical aviation flight theory has, for the most part, taught that such accidents are impossible on the grounds that airplanes fly only with respect to the air mass surrounding them. Accordingly, it was argued, if the wind changes, the aircraft moves with it and no change in flight attitude is perceived. This theory worked well in the past because airplanes were relatively light so that they did indeed move easily with the wind. Lighter airplanes also tend to have fairly powerful engines relative to their inertial mass and therefore can accelerate and compensate for any changes quickly. Thus, given the typical magnitude of wind shear conditions encountered in nature this problem has been largely ignored.

With the development of larger, faster, and heavier aircraft the problem has been growing steadily worse. The faster an airplane travels the faster it passes through changing wind conditions. These greater wind shears demand a greater ability on the part of the aircraft to respond to the new wind. However, newer aircraft are heavier and aerodynamically cleaner so that, to the contrary, they respond less quickly to wind changes. The worsening problem is exemplified by a recent crash at the Boston airport.

On Apr. 7. 1975 a heavy DC-10 aircraft was making an approach to Boston airport and attempting to follow the fixed path through space determined by the glide slope. Wind shears of up to 9.1 knots per hundred feet were encountered during the descent causing the aircraft to encounter an ever increasing headwind. Attempting to stay on the guide slope the autopilot continually reduced the power settings to compensate for the lift of the added headwind. Just about the time that the aircraft became stabilized on the glide slope with the new wind it became necessary to immediately increase the power settings to maintain the proper rate of descent. The autopilot probably would have increased the power sufficiently but unfortunately at this moment the pilots disengaged the autopilot and took over the flight visually which is a routine procedure at this point in an approach. Before the pilots could appreciate the significance of the aircraft's low power condition it was too late and they crashed short of the runway. What the pilots did not know, and could not know because it was masked by the autopilot reducing the throttle settings, was how fast the air speed was changing in comparison to how slowly the inertial speed was changing. It is the purpose of my invention to provide a system that will warn of this condition.

SUMMARY OF THE INVENTION

Briefly, my invention contemplates a system which compares the rate of change of airspeed with the rate of change of inertial speed in an aircraft and warns of any serious discrepancy therebetween. The rate of change of airspeed or acceleration may be determined by differentiating a suitable velocity signal from the airspeed indicator. The rate of change of inertial speed or inertial acceleration may be derived from suitable accelerometers or by making mathematical approximations of the individual aircraft's dynamic responses. The comparison may be made electronically and the warning may be provided either by an analog meter or suitable warning lights or audible signals.

It should be understood that the present invention compares instantaneous accelerations not velocities. Velocity information is practically worthless to the pilot since he has no way of knowing whether the velocity is a result of power application, aircraft attitude, or wind shear conditions. As soon as a wind shear condition is encountered the pilot must be immediately warned that his velocity changes are coming from a wind shear and not from the attitude or power changes. Only in this way can the pilot take early corrective measures before the change of velocity becomes too great to deal with. It is estimated that the present invention would have provided the pilot in the above described accident situation with 20 to 50 seconds of warning time which normally would be more than adequate for an experienced pilot to take corrective action.

Aeronautical textbooks have always described wind shears in a mathematically simplified form wherein two discrete masses of air are moving in different directions or at different speeds relative to each other. Consequently, there has arisen a naive misconception that wind shear is an instantaneous phenomenon encountered at the moment the aircraft passes from one mass of air into the other mass of air. Some pilots believe that "the airplane falls out of the sky under these conditions". This is, of course, untrue. Wind shears often spread out over many hundreds of vertical feet and the time it takes the aircraft to traverse this distance provides a useful warning period, provided the pilot knows from the beginning that a wind shear is being encountered. The only way to maximize this warning time period is to identify the wind shear immediately at the beginning by comparing the airspeed acceleration with the inertial acceleration as does my invention. It may therefore be seen that it is an object of my invention to provide an improved wind shear warning system for aircraft. Further objects and advantages will become apparent upon consideration of the following detailed description and drawings.

BRIEF DESCRIPTION OF THE DRAWINGS

FIG. 1 schematically shows a first preferred embodiment of the invention.

FIG. 2 shows the simplest and most inexpensive embodiment of my invention.

FIG. 3 schematically shows an embodiment wherein the motive power being applied to the aircraft is utilized as an approximation of the inertial acceleration thereof.

FIG. 4 schematically shows a variation on the embodiment of FIG. 1.

FIG. 5 schematically shows the preferred embodiment contemplated for advanced complex aircraft which utilize inertial navigation systems.

FIGS. 6 and 7 show how the present invention may be utilized with different types of airspeed measuring devices.

FIG. 8 schematically demonstrates a special type of airspeed measuring device specifically suited to the present invention wherein the rate of change of airspeed is automatically measured and the effects of static pressure are automatically cancelled out.

FIG. 9 shows a variation in FIG. 8.

DESCRIPTION OF THE PREFERRED EMBODIMENT

In FIG. 1, one possible type of airspeed indicator 10 is shown wherein ram pressure received by a pitot tube 11 is directed through a tube 12 into the interior space 14 of a bellows 16. Static pressure is applied to the outside of bellows 16 in the space 18 to balance out that portion of the ram pressure attributable to atmospheric or static pressure. The bellows 16 is designed to move in response to the pressure differential in a manner well known to those skilled in the art. Bellows designs are common in airspeed indicators where the bellows movement is used to operate pointers. In this case the bellows is used to operate a wiper arm 24 on a voltage bridge 26 by means of a mechanical connection shown as dashed line 20. If desired, the mechanical connection 20 may operate through a suitable damping mechanism 22 which could comprise, for example, a dash pot assembly.

The physical position of bellows 16 could also be detected by an optical encoder, a linear variable differential transformer (LVDT), or any of a number of other devices common to the aircraft instrumentation art. The particular pickoff chosen would determine the type of damping mechanism used to filter out small fluctuations in pressure measured by pitot tube 11 which fluctuations represent turbulence and other effects not associated with true airspeed changes. Also, the position of bellows 16 is proportional to the pressure difference which is, in actuality, proportional to the square of the airspeed. Accordingly, one may wish to characterize the bellows or the readout mechanism to compensate for this effect.

The voltage level on wiper arm 24, which is representative of the airspeed, is coupled through a resistor 28 and a capacitor 29 to an amplifier 34. When the airspeed is constant, the voltage is also constant and this signal does not cross capacitor 29. Any change in airspeed, however, produces a corresponding voltage change proportional to the rate of change of airspeed which momentarily changes the voltage presented to amplifier 34 relative to the reference voltage from source 32. The output signal from amplifier 34 is directed over line 38 to a comparator 40. The signal is also coupled back through a resistor 36 to eliminate the input difference and complete the differentiation performed by differentiator 30. Of course, if the airspeed continues to change there is a continuous change of signal coupled through capacitor 29 causing a continuous output by amplifier 34 of magnitude proportional to the rate of change of airspeed.

If the aircraft is in still air, or constantly moving air, its change in airspeed will reflect only a corresponding change in inertial speed. Accordingly, a longitudinal accelerometer 42 presents an inertial acceleration signal to comparator 40. If this signal equals the airspeed acceleration signal on line 38, there is no output from comparator 40. If the signal from accelerometer 42 is different from the airspeed acceleration signal then at least part of the airspeed acceleration must be the result of changing wind conditions. This difference signal is directed by comparator 40 to either a meter 50A which gives an analog reading of the amount and the sign of the wind shear or to suitable warning signals 50B which may be panel mounted in the aircraft in a suitable manner to attract the pilot's attention.

In this embodiment it is contemplated that warning signals 50B could comprise a pair of reference voltage sources 44 and 45 and a pair of amplifiers 46 and 47 to compare the signal from comparator 40 with the reference voltages presented thereto. Amplifiers 46 and 47 are connected with opposite polarities so that one detects an increase in airspeed while the other detects a decrease in airspeed. If the difference is large enough, the outputs of amplifiers 46 and 47 exceed predetermined levels established by shunting diodes 48 and 49 and operate suitable annunciators 52 and 53. One possible annunciator could be a light which comes on in front of the pilot indicating a wind shear speed gain or loss. Other possibilities include audible warnings, or inputs directly to the autopilot to automatically compensate for the condition.

In FIG. 2 an embodiment of the invention is disclosed which is very inexpensive and therefore more applicable to light aircraft. The accelerometer 42 used in the first embodiment constitutes a reference signal generating means which is highly accurate in indicating exactly what is happening to the aircraft. It is possible, however, to use the aircraft itself as the inertial mass or accelerometer. In this method one determines experimentally what the maximum ability of the aircraft is to respond to wind changes and defines this by means of a voltage from adjustable reference source 54. Any airspeed acceleration greater than this can be assumed to be the result of wind shear. Thus, the airspeed acceleration is determined by indicator 10 and differentiator 30 and compared by a comparator 56 with the reference source 54. This signal is used to operate a meter or warning signals 50. Since the airspeed acceleration could be the result of changing the applied power or the flight attitude, it might be desirable to be able to disable the system of FIG. 2 until such time as the aircraft is established on the glide slope during an approach. In this configuration the aircraft is stabilized in flight with a constant airspeed and rate of descent and a warning of any unexplainable change in airspeed is desirable.

Another way of providing a reference signal corresponding to the inertial acceleration of the airplane is shown in FIG. 3. Here the throttle or power monitoring instruments may be used to develop a signal indicative of the amount of thrust being developed by the engine. This thrust is normally approximately proportional to the velocity of the aircraft. If the power changes the aircraft changes its speed. This changing power signal can be differentiated by a differentiator 58 to develop a reference signal roughly proportional to the inertial acceleration. As shown in FIG. 3, this reference signal is compared by a comparator 59 to the airspeed acceleration from differentiator 30 and the output signal used to operate a meter or warning signal 50. Since the power or thrust may not be applied along the same axis as the inertial acceleration it might be desirable to correct the input information signal for the attitude of the aircraft in a manner similar to that shown in FIG. 4.

In FIG. 4 the airspeed acceleration is compared by a comparator 67 with corrected information from an accelerometer 64 which may be fixed in position in the aircraft. A microprocessor 66 is utilized to correct the information in accordance with a pitch signal derived from the artifical horizon 62 in a manner well known to those skilled in the art. The arrangement of FIG. 4 eliminates the possible necessity of having to gimbal the accelerometer so as to measure acceleration only along the flight path. It is clear that the correction shown in FIG. 4 may also be applied to the apparatus of FIG. 3 wherein the power is being monitored.

Large commercial aircraft today are often equipped with inertial navigation systems that employ accelerometers and computers to determine their position in space. It would be routine to derive a longitudinal acceleration signal from such an inertial navigation system and this is the scheme shown in FIG. 5. A comparator 73 looks at the difference in airspeed acceleration and inertial acceleration as measured by an inertial navigation system 70. In FIG. 5 it is also contemplated that the input from the airspeed differentiator 30 could be corrected by input information from a throttle or power monitoring unit 71 suitably differentiated by a differentiator 72. These corrections would avoid the exact circumstance outlined in the introductory portion of this specification with respect to the aircraft accident in Boston. For a while it is conceivable that an autopilot using airspeed as a reference source could mask a wind shear condition by suitable throttle or power adjustment, thus, delaying the warning to the pilot until the autopilot had run out of power adjustment capability. The embodiment of FIG. 5 avoids this possibility by taking note of the condition in which a large amount of power change is necessary to make the airspeed acceleration match the inertial acceleration. In the alternative, the correction signal from the throttle monitoring unit 71 could be used to correct the inertial acceleration signal.

FIGS. 6 and 7 show other possible airspeed monitoring devices that could be substituted directly into the present invention. If a silicon strain gauge transducer 75 is used to measure the pressure difference between the pitot or total pressure and the static pressure, a square rooting amplifier 76 is included since the velocity is proportional to the square root of the pressure difference. This signal is then differentiated by differentiator 30 and used in the manner described earlier. FIG. 7 shows another technique known to those in the art for measuring airspeed utilizing a hot film or hot wire probe 77. The signal from the probe (usually connected in a bridge) is amplified by an amplifier 78 and linearized by a linearizer 79 and then presented to differentiator 30.

In FIG. 8 the present invention contemplates an airspeed measuring instrument 80 especially suitable to the acceleration comparison task involved. The pitot pressure is brought to a T-connection 81 and directed through an orifice 82 into a chamber 83 behind a bellows 86. The ram pressure is also directed through an orifice 84 to a chamber 85 behind bellows 86. Thus, the portion of the pressure attributable to atmospheric or static pressure is present on both sides of the bellows and automatically cancels out. Orifice 82 is chosen to be just small enough to act as an aerodynamic filter and smooth out tiny fluctuations so that the pressure in chamber 83 corresponds to an average pressure representing the steady state airspeed. If the airspeed does not change the pressure in chamber 85 is the same so that bellows 86 rests in a neutral position. If the airspeed changes, chamber 83 adjusts quite quickly due to the size of the orifice 82. Orifice 84 is chosen to be somewhat smaller, however, so that the pressure change in chamber 85 lags behind that in chamber 83 causing bellows 86 to move in an amount proportional to the pressure difference between chamber 85 and chamber 83. The magnitude of the pressure difference and the movement of the bellows is, of course, determined by the rate of change of airspeed.

The movement of bellows 86 is changed into an electrical signal by a mechanical connection 87 operating through a wiper arm 88 on a voltage bridge 89. Once again an optical pickoff or an LVDT or the like could be used. Comparator 90 produces a signal proportional to the differences between airspeed acceleration as detected by indicator 80 and the inertial acceleration as determined by an accelerometer 91. The output is used to operate an analog meter or suitable warning signals 50.

One variation on the apparatus of FIG. 8 is shown in FIG. 9. In FIG. 9, mechanical connection 87 moves a switch contact arm 92. If arm 92 moves a sufficient distance it completes a circuit with either a contact 94 or a contact 93 and activates a signal 95 or 96. The position of contacts 93 and 94 can be adjusted to provide a different threshold of activation in the positive direction from the negative direction. Any type of limit detectors could be used in place of contacts 93 and 94 such as optical or magnetic pickoffs. Thus, accelerometer 91 may be eliminated and the signal from indicator 80 used directly as an indication of wind shear. With this technique contacts 93 and 94 would be analogous to the adjustable reference voltage source 54 in FIG. 2.

It is clear that numerous varations in design are possible without departing from the spirit and scope of the invention and therefore I do not intend to be bound to the particular embodiments disclosed in FIGS. 1 through 9 except as defined by the appended claims.

I claim:

1. A system to detect a wind shear condition encountered by an aircraft having a pitot pressure sensing tube for measuring air speed comprising in combination:
   pitot pressure sensing means;
   pressure change measuring means connected to said pressure sensing means operable to produce a signal proportional to the rate of change of pressure in said pitot tube;
   a reference means calibrated to represent the maximum acceleration capability of said aircraft; and
   indicating means connected to said pressure change measuring means and said reference means so as to display the signal therefrom relative to the reference means.

2. The system of claim 1 in which said signal from said pressure change measuring means comprises an electronic signal of magnitude proportional to the rate of change of pressure and in which said reference means comprises a fixed voltage reference means adjusted to represent the acceleration characteristics of the aircraft.

3. The system of claim 1 in which said pressure change measuring means comprises a diaphragm connected in a sealing relationship on one side to receive and move in response to pressure from the pitot tube, the connection being through an orifice sized to filter out short term fluctuations, with the other side of the diaphragm also connected in a sealing relationship to the same pressure from the pitot tube but through a smaller orifice sized to delay the response of the diaphragm on that side for a time characterized so that the diaphragm displacement is proportional to the rate of change of pressure, said indicating means connected to said diaphragm.

4. The system of claim 3 in which said indicating means comprises a switch contact arm connected to said diaphragm and moving between adjustable limit positions and in which said reference means comprise detectors at said limits.

* * * * *